(12) United States Patent  (10) Patent No.: US 8,116,208 B2
El-Hassan et al.  (45) Date of Patent: Feb. 14, 2012

(54) SYSTEM AND METHOD FOR TESTING MULTIPLE DIGITAL SIGNAL TRANSCEIVERS IN PARALLEL

(75) Inventors: Wassim El-Hassan, San Jose, CA (US); Christian Volf Olgaard, Saratoga, CA (US); Dirk Walvis, Santa Cruz, CA (US)

(73) Assignee: Litepoint Corporation, Sunnyvale, CA (US)

( * ) Notice: Subject to any disclaimer, the term of this patent is extended or adjusted under 35 U.S.C. 154(b) by 281 days.

(21) Appl. No.: 12/691,387

(22) Filed: Jan. 21, 2010

(65) Prior Publication Data

US 2011/0090799 A1  Apr. 21, 2011

Related U.S. Application Data

(60) Provisional application No. 61/252,893, filed on Oct. 19, 2009.

(51) Int. Cl.
*H04W 24/06* (2009.01)
*H04L 12/56* (2006.01)

(52) U.S. Cl. ...................................................... 370/241
(58) Field of Classification Search ................... 370/241
See application file for complete search history.

(56) References Cited

U.S. PATENT DOCUMENTS

| | | | |
|---|---|---|---|
| 4,364,080 A | 12/1982 | Vidovic | |
| 5,335,010 A | 8/1994 | Lindemeier et al. | |
| 5,603,113 A | 2/1997 | De Loe, Jr. | |
| 6,229,808 B1 | 5/2001 | Teich et al. | |
| 6,442,163 B1 | 8/2002 | Chopping | |
| 6,480,489 B1 | 11/2002 | Muller et al. | |
| 6,532,357 B1 | 3/2003 | Ichikawa | |
| 6,714,985 B1 | 3/2004 | Malagrino et al. | |
| 6,779,050 B2 | 8/2004 | Horton et al. | |
| 6,781,992 B1 | 8/2004 | Rana et al. | |
| 6,785,239 B1 | 8/2004 | Tasker | |
| 6,950,442 B2 | 9/2005 | Chai et al. | |
| 6,963,572 B1 | 11/2005 | Carr et al. | |
| 7,126,515 B1 | 10/2006 | Kris | |
| 7,265,629 B2 | 9/2007 | Manku | |
| 7,292,102 B2 | 11/2007 | Lee et al. | |
| 7,426,377 B2 | 9/2008 | Tanaka et al. | |
| 7,484,146 B2 | 1/2009 | Olgaard et al. | |
| 7,567,521 B2 | 7/2009 | Olgaard et al. | |
| 7,772,922 B1 * | 8/2010 | Olgaard et al. | .................... 330/2 |
| 7,962,823 B2 * | 6/2011 | Olgaard | ......................... 714/742 |
| 2001/0010751 A1 | 8/2001 | Amino et al. | |
| 2002/0031125 A1 | 3/2002 | Sato et al. | |
| 2002/0105947 A1 | 8/2002 | Kitagawa et al. | |
| 2002/0116694 A1 | 8/2002 | Fournier et al. | |
| 2003/0119463 A1 | 6/2003 | Lim | |

(Continued)

FOREIGN PATENT DOCUMENTS

KR  10-2002-0006152 A  1/2002

OTHER PUBLICATIONS

Mexican Office Action dated Mar. 15, 2011 for Mexican Patent Application No. MX/a/2009/010601, 7 pages.

(Continued)

*Primary Examiner* — Melvin Marcelo

(57) ABSTRACT

A method for contemporaneously testing multiple digital data packet transceivers using predefined UL test sequences of synchronized data packets by pre-configuring test measurements, and multiplexing and interleaving portions of the data packets from the devices under test (DUTs).

18 Claims, 6 Drawing Sheets

U.S. PATENT DOCUMENTS

| | | |
|---|---|---|
| 2004/0133733 A1 | 7/2004 | Bean et al. |
| 2004/0198257 A1 | 10/2004 | Takano et al. |
| 2005/0176376 A1 | 8/2005 | Liu |
| 2005/0208910 A1 | 9/2005 | Burns et al. |
| 2005/0243743 A1 | 11/2005 | Kimura |
| 2005/0281232 A1 | 12/2005 | Kim et al. |
| 2006/0106946 A1 | 5/2006 | Agarwal et al. |
| 2006/0107186 A1 | 5/2006 | Cowell et al. |
| 2006/0195732 A1 | 8/2006 | Deutschle et al. |
| 2006/0220742 A1 | 10/2006 | Manku |
| 2007/0070691 A1 | 3/2007 | Walvis et al. |
| 2007/0070881 A1 | 3/2007 | Olgaard et al. |
| 2007/0071034 A1 | 3/2007 | Fleming |
| 2007/0177520 A1 | 8/2007 | Morinaga et al. |
| 2007/0280196 A1 | 12/2007 | Olgaard et al. |
| 2007/0294378 A1 | 12/2007 | Olgaard et al. |
| 2008/0172588 A1 | 7/2008 | Olgaard |
| 2008/0181125 A1 | 7/2008 | Imai |
| 2008/0298271 A1 | 12/2008 | Morinaga et al. |

OTHER PUBLICATIONS

Office Action dated Apr. 27, 2011 for U.S. Appl. No. 12/563,325, 20 pages.
International Search Report corresponding to PCT Application No. PCT/US2010/052283, 5 pages, mailed May 23, 2011.
Written Opinion corresponding to PCT Application No. PCT/US2010/052283, 4 pages, Mailed May 23, 2011.
International Search Report corresponding to PCT Application No. PCT/US2010/048938, 6 pages, mailed May 26, 2011.
Written Opinion corresponding to PCT Application No. PCT/US2010/048938, 5 pages, mailed May 26, 2011.
U.S. Appl. No. 60/596,444, filed Sep. 23, 2005, Method for Simultaneous Testing of Multiple Orthogonal Frequency Division Multiplexed Transmitters with Single Vector Signal Analyzer.
International Search Report for PCT/US07/67856, dated Sep. 18, 2008.
Written Opinion for PCT/US07/67856, dated Sep. 18, 2008.
International Search Report for PCT/US07/67853, dated Jun. 6, 2008, 2 pages.
Written Opinion for PCT/US07/67853, dated Jun. 6, 2008, 3 pages.
International Search Report for PCT/US08/56827, dated Jun. 23, 2008, 2 pages.
Written Opinion for PCT/US08/56827, dated Jun. 23, 2008, 5 pages.
International Search Report for PCT/US2010/028990, filed Mar. 29, 2010, 4 pages.
Written Opinion of the International Searching Authority for PCT/US2010/028990, filed Mar. 29, 2010, 4 pages.

* cited by examiner

SYSTEM AND METHOD FOR TESTING MULTIPLE DIGITAL SIGNAL TRANSCEIVERS IN PARALLEL

CROSS-REFERENCE TO RELATED APPLICATIONS

This application claims the benefit of priority of U.S. Provisional Application No. 61/252,893 filed on Oct. 19, 2009, which is incorporated by reference in its entirety.

BACKGROUND

1. Field of the Invention

The present invention relates to systems and methods for testing multiple digital signal transceivers in parallel, taking advantage of predefined uplink (UL) test sequences, configuring the test equipment measurements for different segments of the UL test sequence, and decreasing overall test time thereby.

2. Related Art

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data.

In general, all of these wireless-connectivity capabilities (e.g. WiFi, WiMAX, Bluetooth, etc.) are defined by industry-approved standards (e.g. IEEE 802.11 and IEEE 802.16) which specify the parameters and limits to which devices having those connectivity capabilities must adhere.

At any point along the device-development continuum, it may be necessary to test and verify that a device is operating within its standards' specifications. Testing takes time, requires specialized instrumentation, and adds to the cost of producing such devices. Therefore, inventions that can reduce overall test time without compromising on required thoroughness are very desirable.

When devices are tested contemporaneously (i.e. in parallel), test-time per unit is reduced by the number of devices. For example, if testing a single device takes 100 seconds, and testing four of them contemporaneously can be done in 120 seconds using essentially the same measurement equipment, then the test-time per device is now 30 seconds.

SUMMARY

In accordance with the present invention, multiple digital data packet transceivers can be tested contemporaneously using predefined UL test sequences of synchronized data packets by pre-configuring test measurements, and multiplexing and interleaving portions of the data packets from the devices under test (DUTs).

In accordance with one embodiment of the presently claimed invention, a method of testing a plurality of data signal transmitters with a data signal analyzer includes:

receiving a plurality N of packet data signals simultaneously from a corresponding plurality N of data signal transmitters, wherein each one of the plurality N of packet data signals has a respective plurality of sequential signal intervals, each one of the plurality of sequential signal intervals has a signal interval duration I, and each one of the plurality N of packet data signals has a respective packet data signal characteristic during each one of the respective plurality of sequential signal intervals;

capturing a respective portion of the respective plurality of sequential signal intervals from each one of the plurality N of packet data signals to provide a plurality N of captured portions of the respective plurality of sequential signal intervals, wherein each one of the plurality N of captured portions of the respective plurality of sequential signal intervals has a captured signal duration C; and processing each one of the plurality N of captured portions of the plurality of sequential signal intervals in accordance with a signal test having a test duration T associated therewith;

wherein the captured signal duration C is greater than or equal to the test duration T when the test duration T is greater than a portion I/N of the signal interval duration I, and less than or equal to the portion I/N of the signal interval duration I when the test duration T is less than or equal to the portion I/N of the signal interval duration I.

In accordance with another embodiment of the presently claimed invention, a method of testing a plurality of data signal transmitters with a data signal analyzer includes:

receiving a plurality N of packet data signals simultaneously from a corresponding plurality N of data signal transmitters, wherein each one of the plurality N of packet data signals has a respective plurality of sequential signal intervals, each one of the plurality of sequential signal intervals has a signal interval duration I, and each one of the plurality N of packet data signals has a respective packet data signal characteristic during each one of the respective plurality of sequential signal intervals;

capturing a respective portion of the respective plurality of sequential signal intervals from each one of the plurality N of packet data signals to provide a plurality N of captured portions of the respective plurality of sequential signal intervals, wherein each one of the plurality N of captured portions of the respective plurality of sequential signal intervals has a captured signal duration C; and processing each one of the plurality N of captured portions of the plurality of sequential signal intervals in accordance with a signal test having a test duration T associated therewith;

wherein the captured signal duration C is greater than or equal to the test duration T when the test duration T is greater than a portion I/N of the signal interval duration I.

In accordance with another embodiment of the presently claimed invention, a method of testing a plurality of data signal transmitters with a data signal analyzer includes:

receiving a plurality N of packet data signals simultaneously from a corresponding plurality N of data signal transmitters, wherein each one of the plurality N of packet data signals has a respective plurality of sequential signal intervals, each one of the plurality of sequential signal intervals has a signal interval duration I, and each one of the plurality N of packet data signals has a respective packet data signal characteristic during each one of the respective plurality of sequential signal intervals;

capturing a respective portion of the respective plurality of sequential signal intervals from each one of the plurality N of packet data signals to provide a plurality N of captured portions of the respective plurality of sequential signal intervals, wherein each one of the plurality N of captured portions of the respective plurality of sequential signal intervals has a captured signal duration C; and processing each one of the plurality N of captured portions of the plurality of sequential signal intervals in accordance with a signal test having a test duration T associated therewith;

wherein the captured signal duration C is less than or equal to the portion I/N of the signal interval duration I when the test duration T is less than or equal to the portion I/N of the signal interval duration I.

DETAILED DESCRIPTION

Figure 1:
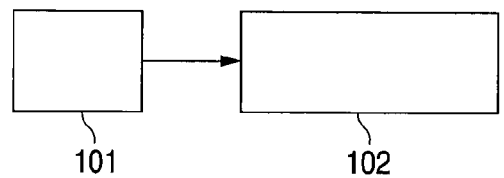
FIG. 1 is a diagram depicting a conventional method for testing the transmit (TX) function of a device under test (DUT) that employs a wireless standard, such as WCDMA, where the transmitted sequence is sent to a vector signal analyzer (VSA) for analysis.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawing, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implements using one or more appropriately programmed processors, depending upon the signal frequencies or data rates to be processed.

Referring to FIG. 1, a conventional test system for testing a wireless standard such as WCDMA, would test the DUT's 101 transmitted sequence by sending the signal to a VSA for analysis. In a typical scenario, the DUT 101 would be controlled by the VSA 102 via one or more control signals (not shown). Alternatively, the DUT 101 and VSA 102 could be controlled by a controller (not shown), e.g., a personal computer (PC), via one or more respective control signals (not shown).

Figure 2:
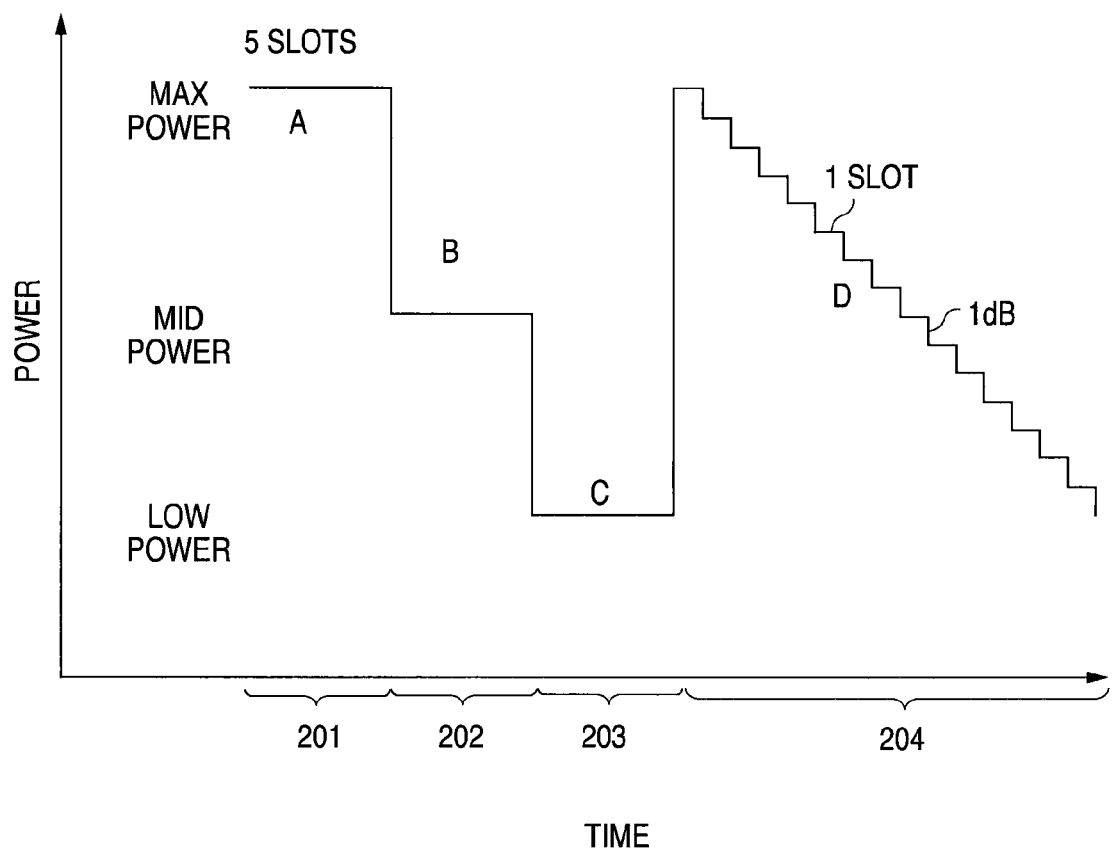
FIG. 2 is a diagram depicting a predefined test sequence where maximum power is transmitted for 5 time slots; mid-range power is transmitted for 5 times slots; and low power is transmitted for 5 time slots. Then, for the next 75 occurrences of single-slot time duration, the signal's power is stepped down in equal increments from a high power to a low power limit.

Referring to FIG. 2, a TX packet provided by the DUT 101 to the VSA 102, as described in the previous paragraph, could be preconfigured to enable specific parameter testing in accordance with some industry standard (e.g., WCDMA). The first portion of the UL sequence 201 would send a signal at maximum power for a specific duration. In this case, using WCDMA to illustrate, the UL can be subdivided into time slots where in a 10 millisecond duration, 15 equal slots would represent 0.67 milliseconds per slot. A 5 slot duration would be 5*0.67 milliseconds, for example, and would be sufficiently long to support a power spectral density (PSD) mask evaluation. Similarly, in the next set of 5 slots, an intermediate power signal 202 is sent, and a low-power signal portion would be sent in the next 5-slot duration 203. Then, in conformance with the test for Inner Loop Power Control (ILPC), a sequence of single-slot power levels are sent in 1 dBm steps from +25 dBm to −50 dBm. It should be pointed out that without a predefined UL sequence, the duration of these 1 dBm power levels is usually longer than 1 slot time, and communications between the test equipment (e.g., VSG or VSA) and DUT would precede each step adding latency time to the overall test time.

As will be readily appreciated, each time slot will have its own respective packet data signal characteristic (e.g., peak power, average power, power spectral density, modulation, etc.), each of which can be different or similar from one time slot to another, or different from or similar to that of any other previous or subsequent time slot, depending upon what is desired to be tested. This can also be true for signals transmitted during any time slots by any of the DUTs.

Figure 3:
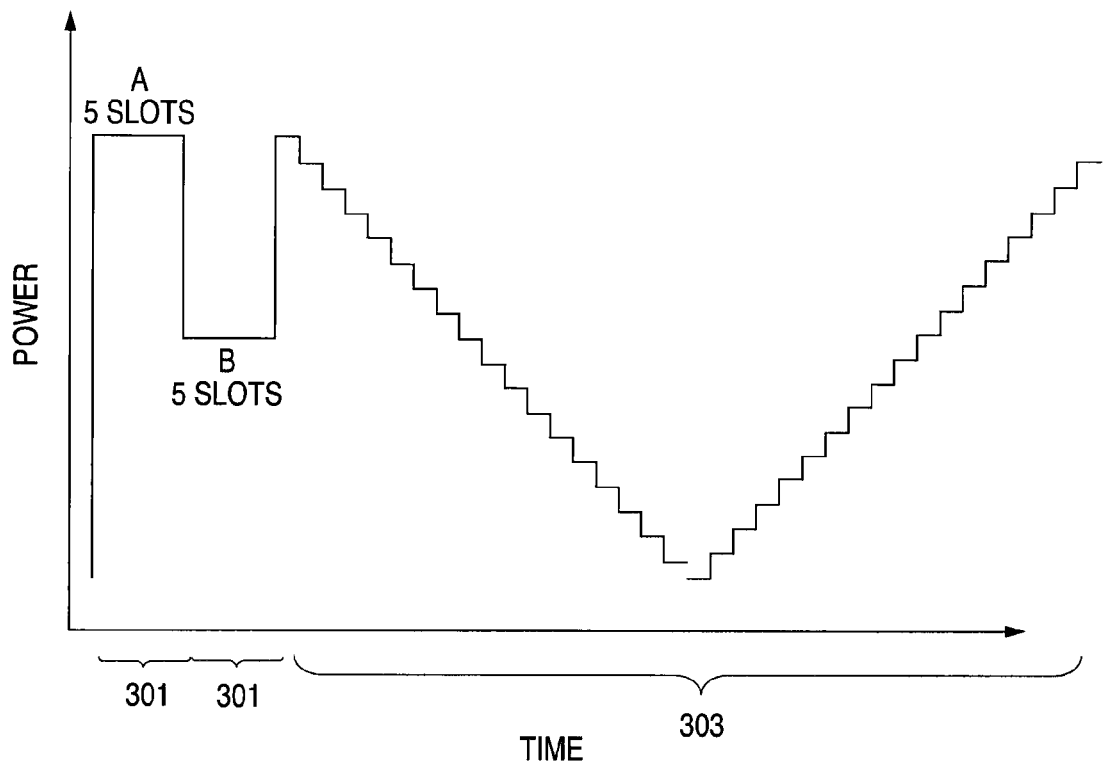
FIG. 3 is a diagram depicting a different predefined sequence in the UL packet. Here, the maximum power is sent for 5 slots, intermediate power for 5 slots, and a sequence of single-slot power levels is sent first decreasing then increasing between two specified power limits.

Referring to FIG. 3, a different predefined TX sequence is shown where only two power levels are sent (high and intermediate) over sequential 5-slot signal durations 301, 302 followed by a sequence of single-slot signal power levels that step down from +25 dBm to −50 dBm, then step up from −50 dBm to +25 dBm. Measuring the step-wise decrease and then the step-wise increase in power is a way to identify devices that produce different results for the one versus the other. In such devices, it is possible that a test of descending power steps could meet specifications whereas that for ascending power steps may not. Thus, this sequence could be used to test compliance with a standard's ILPC specifications, for example. Again, it should be noted that no intervening communications between the test equipment and DUT is necessary to support the entire sequence 301, 302, 303. All that is necessary is that the test equipment and DUT be synchronized so that the UL sequence corresponds with the appropriate test measurement configuration.

Figure 4:
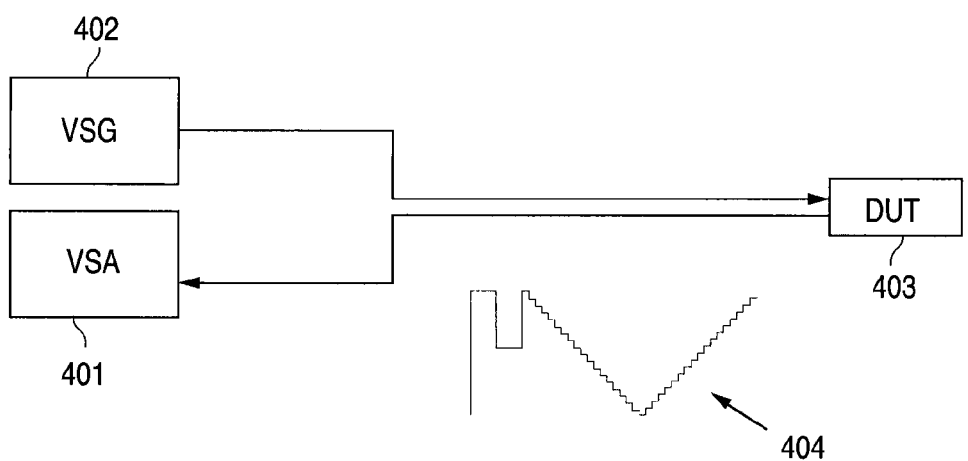
FIG. 4 is a diagram depicting one method for transmitting a trigger signal from a vector signal generator (VSG) which initiates a transmitted sequence that is sent to a VSA for analysis.

Referring to FIG. 4, this shows how a test system using a combination of VSA 401 and VSG 402 could be used to send a trigger signal to a DUT 403 and elicit a predefined TX sequence 404.

Figure 5:
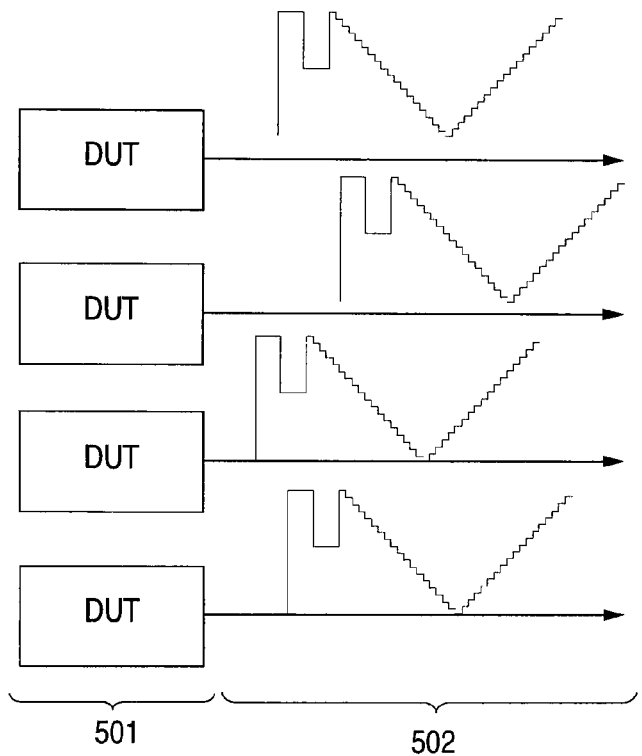
FIG. 5 is a diagram depicting multiple DUTs transmitting the same predefined TX sequence.

Referring to FIG. 5, unless suitably controlled, e.g., via one or more respective control signals (not shown) provided to each of the DUTs 501, e.g., from a VSA (not shown) or a PC (not shown), the respective TX sequences transmitted by the DUTs will not be synchronous and may not even be substantially simultaneous. In accordance with the presently claimed invention, the TX sequences of the multiple are preferably synchronized so as to correspond in time.

Figure 6:
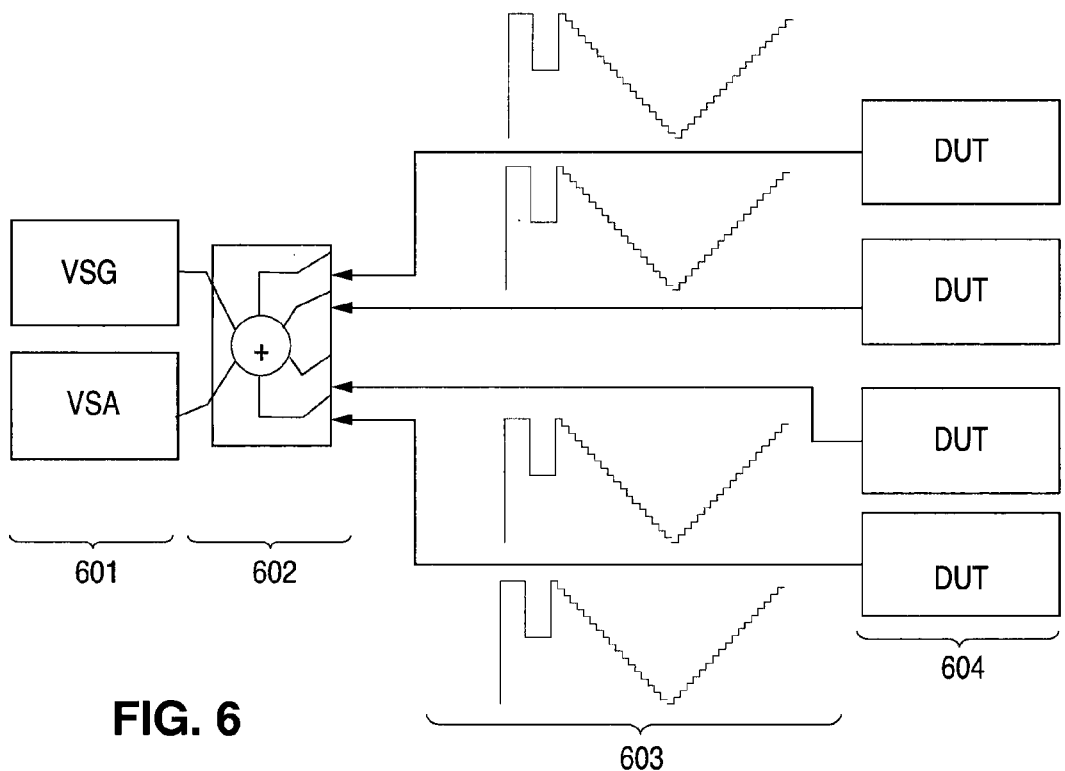
FIG. 6 is a diagram depicting multiple DUTs where a VSG sends a trigger signal to each, simultaneously, which synchronizes the TX predefined sequences.

Referring to FIG. 6, here a set of multiple DUTs is connected to a test system where a VSG sends a trigger signal via signal routing circuitry 602 (e.g., signal switching or combining circuitry), to all the DUTs, simultaneously, thereby synchronizing their predefined TX sequences. If these sequences are sent at different frequencies, it is possible to sum 602 the results and obtain reliable test results using digital signal processing (e.g., one could separate the signals into multiple individual signals and analyze them separately, or use other well known techniques). If the sequences are transmitted at the same frequency, using well-known techniques for time-division multiplexing, or time-division duplex (TDD), portions of the signals from each DUT can be captured and all of the DUTs can be tested in parallel, e.g., by inputting time-interleaved signal portions to the VSA 601 for analysis (discussed in more detail below).

Figure 7:
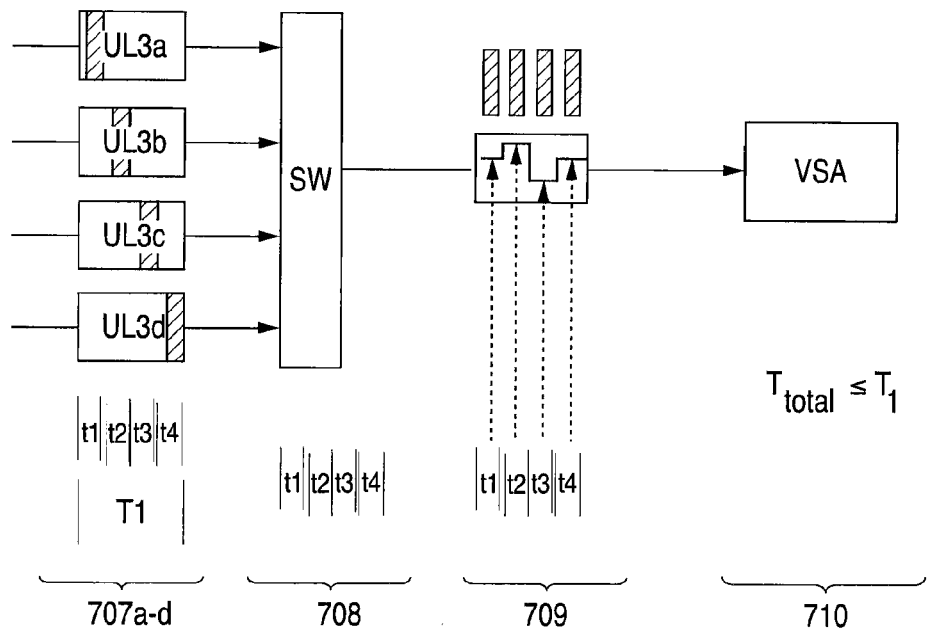
FIG. 7 is a diagram depicting the time-division multiplexing used in the configuration of FIG. 6.

Referring to FIG. 7, the contemporaneous TX packets 707a-d UL3a, UL3b, UL3c, UL3d produced using the DUTs 604 in FIG. 6 can be multiplexed by a switching circuit 708, controlled via one or more control signals (not shown) provided by a controller (not shown), e.g., a VSA or a PC, so that only a portion of each of the four TX packets is actually switched, sequentially, within the total duration time of a single packet. So, for example, with a switched sampling interval of 100 microseconds, portions of each TX packet would be sequentially transferred by the switch 708 producing an interleaved packet 709 whose signal consists of a sequence of 100 microsecond portions t1, t2, t3, t4 of the original TX packets 707a-d. Here, again, this switching method is illustrative rather than exclusive. For example, a 1:4 switch could be used, or a pair of 1:2 switches could be used, or a programmable attenuator could be programmed to achieve the same result. The VSA 710 receives the time-interleaved packet 709 and can discern via synchronization, e.g., in accordance with one or more control signals (not shown) provided by a controller (not shown), e.g., a VSA or a PC, which portion of the received packet was contributed by which TX packet 707a-d. For measurements of power, for example, only a small portion of the packet needs to be measured. By interleaving small portions of the four TX packets 707a-d, the VSA is able to test within one 0.67 millisecond interval the power output of all four DUTs. Power measurement is a key component of DUT calibration, and is often one of the longer testing procedures. Cutting the major component of calibration testing through parallel testing combined with time-interleaved capture can have a significant impact on test-time efficiencies.

Figure 8:
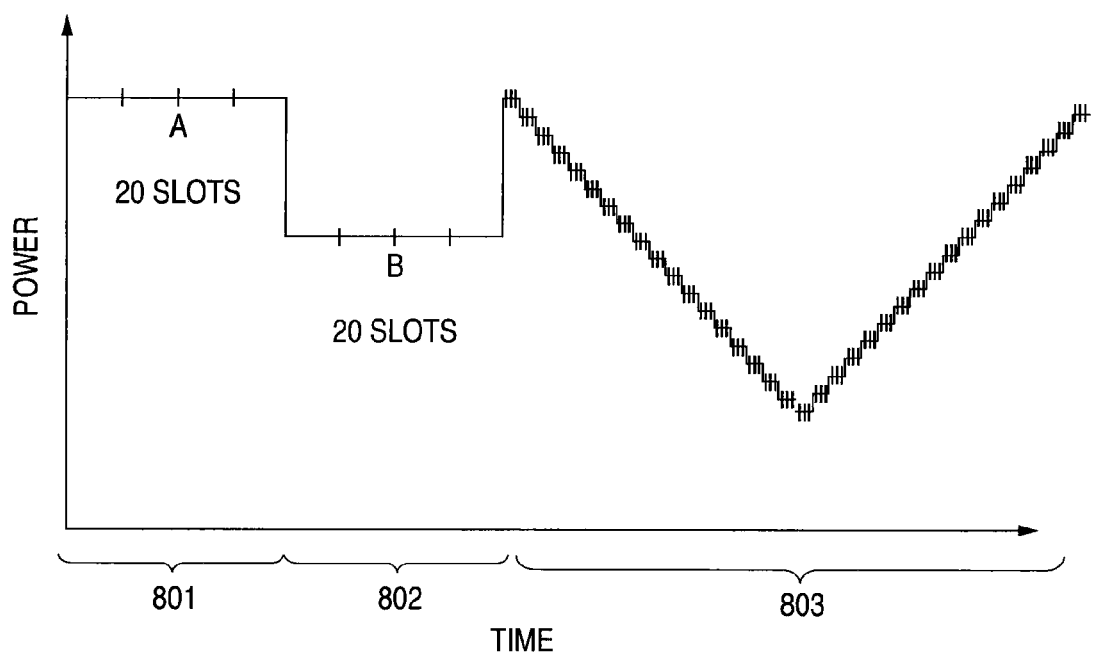
FIG. 8 is a diagram depicting a predefined TX sequence that would enable parallel testing of multiple DUTs.

Referring to FIG. 8, this diagram depicts one way in which a TX packet can be predefined to allow testing of four DUTs, contemporaneously, as described in the description of FIG. 7. The duration for interval 801 is 20 slot times allowing enough time to capture and process the signal portions for each DUT to satisfy the requirements for a lengthy PSD test. In interval 802, the duration is again 20 slot times for the same reason. However, one may not need 20 time slots. If the spectral properties can be measured in 4.25 time slots, for example, one would need only 17 time slots (i.e. 4*4.25). Similarly, if the test to be conducted requires less than all but more than half of a time slot (e.g., 0.75), then fewer but still multiple time slots would be needed (e.g., 4*0.75=3 time slots). In interval 803, where ILPC is being verified, the single-slot time is sufficient to allow all four DUTs to be tested during that single-slot time duration. As one cannot typically subdivide the time slots, in a single DUT test, one would need to assign 5 time slots for the PSD measurement, thus even in cases where information is beyond the minimal timeslot, the transmission times does not need to grow linearly with the number of devices tested in parallel This combination of predefined TX sequences with either frequency- or time-division multiplexing will achieve a reduction in test time.

Accordingly, for testing, in a time-division multiplexed, or time-division duplex (TDD), manner, N DUTs transmitting signals having time slot durations of I for performing a test (e.g., PSD) requiring a time T to complete, the duration C of the captured signals duration C would be: greater than or equal to the test time T when the test time T is greater than a portion I/N of the time slot duration I; and less than or equal to such portion I/N of the time slot duration I when the test time T is less than or equal to such portion I/N of the time slot duration I.

Further in accordance with the presently claimed invention, the TDD, or sequenced capture, technique discussed above can be combined with FDD capture in which multiple DUTs are operated in parallel but at different frequencies.

Figure 9A:
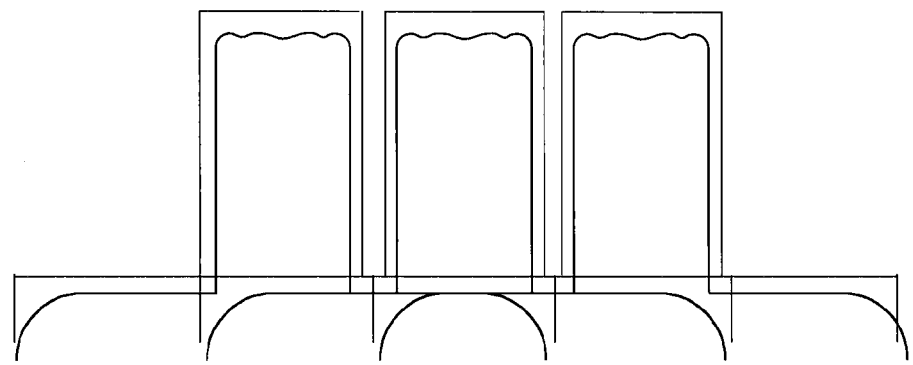
FIGS. 9A-9C depict frequency-division multiplexing of signals for frequency-division duplex (FDD) capture.
Figure 9B:
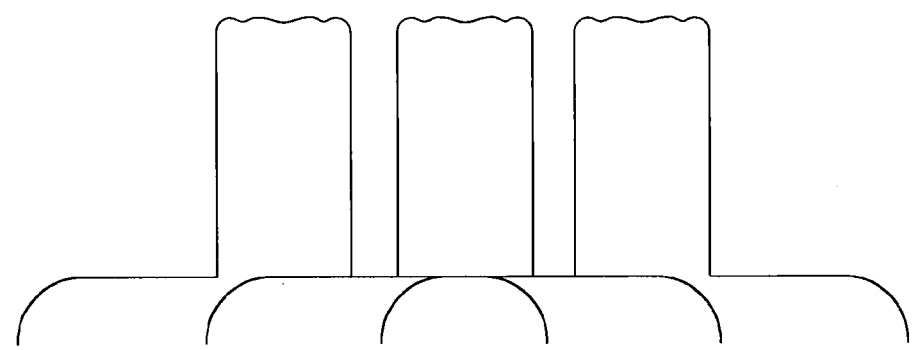
Figure 9C:
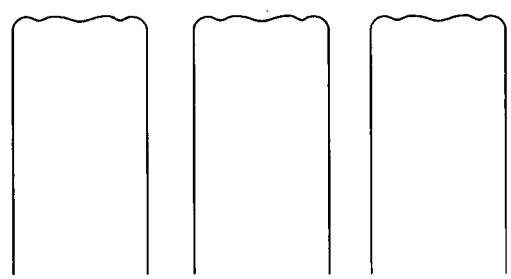

Referring to FIG. 9A, when executing spectral measurements in a FDD operation, signals from adjacent (in frequency) DUTs will often overlap the frequency range in which measurements are to be taken for testing purposes. Referring to FIGS. 9B-9C, however, by applying a filter function to the received signals (FIG. 9B), e.g., by filtering the signals with hardware filters or processing the signals with digital filters, filtered signals (FIG. 9C) can be produced for evaluating in-band signal properties, e.g., error vector magnitude (EVM), etc. As discussed in more detail below, this can be used to further reduce test time.

As discussed above, power measurements can already be performed using TDD within a single time slot. While it is also possible to measure signal power of the individual DUTs using FDD by filtering the signals, it may not be advantageous over using TDD, since the analysis required to filter the signals will often be more complex than simple power measurement and test duration is unchanged (one time slot).

However, for EVM testing in which, due to typical signal quality, a full time slot or more is generally required to perform the necessary measurements, such measurement can be performed using FDD by operating the DUTs in parallel at different frequencies. (Other measurements, e.g., mask, however, will generally require use of TDD, as discussed above, which provides the potential benefits of operating over multiple time slots.)

Figure 10A:
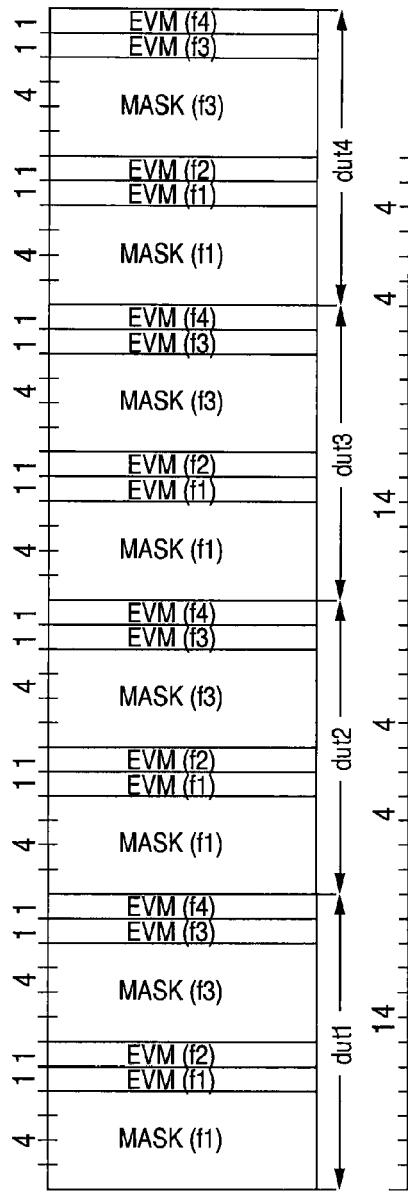
FIGS. 10A-10C depict time-division duplex (TDD) combined with FDD capture for testing multiple DUTs.

Referring to FIG. 10A, for example, two mask measurements requiring 3.5 time slots each at frequencies f1 and f3, and four EVM measurements at frequencies f1, f2, f3 and f4 requiring one full time slot each are depicted. For purposes of the following examples, four DUTs DUT1, DUT2, DUT3, DUT4 (not shown) are operating, and in the first example, sequentially. The mask measurement will require four time slots as discussed above.

Figure 10B:
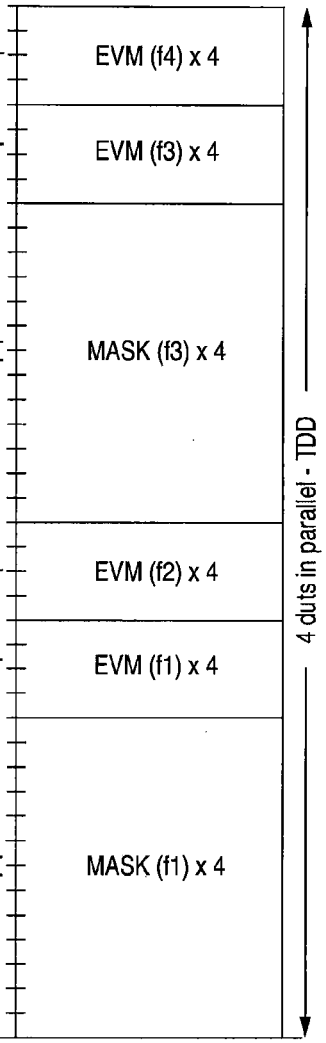

Referring to FIG. 10B, using TDD techniques, as discussed above, can reduce each mask measurement to 14 time slots (4*3.5), but each EVM measurement will require the same time as the fully sequential measurement. However, some advantages can nonetheless be realized from the ability to now perform parallel analyses downstream, as discussed above.

Figure 10C:
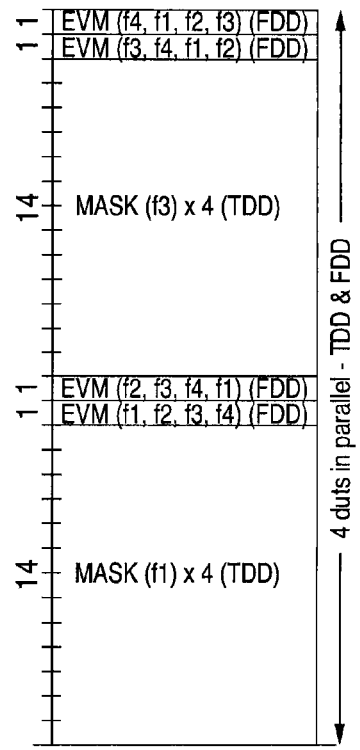

Referring to FIG. 10C, the TDD and FDD techniques discussed above can be combined. The mask is measured using TDD techniques, thus occupying 14 time slots (4*3.5). The EVM is measured using FDD techniques, with the frequencies rotating (f1, f2, f3, f4, f1, f2, f3, f4, . . . ). For example, DUT1 will measure EVM first at f1, then at f2, then at f3 and then at f4. Meanwhile, DUT2 will measure EVM first at f2, then at f3, then at f4 and then at f1. Similarly, DUT3 will measure EVM first at f3, then at f4, then at f1 and then at f2, and DUT4 will measure EVM first at f4, then at f1, then at f2 and then at f3. It will be readily understood that these frequency sequences can be implemented differently so long as each DUT does not transmit at the same frequency at the same time.

These examples describe a preferred scenario in which the number of EVM measurements requested equal the number of DUTs. If the number of EVM measurements requested were less than the number of DUTs, then the larger number (i.e., equal to the number of DUTs) of EVM measurements would be required to retrieve the EVM for the fewer frequencies (assuming the EVM is to be measured at the same frequency for all DUTs). For example, if three EVM measurements are requested while testing four DUTs, e.g., at frequencies f1, f2 and f3, it would still take four EVM measurements to retrieve the EVM for the three frequencies.

While implementing the FDD techniques discussed above can stress the DUT hardware more. For example, transmitting four high-port frequencies into an instrument will often increase the power level by approximately 6 dB, and inter-modulation products will likely be generated unless high instrument linearity can be maintained. However, the worst inter-modulation products in the frequency planning can be handled by selecting the best-suited frequencies for EVM measurement. Alternatively, the number of simultaneous transmitters to be measured can be reduced. Accordingly, combining FDD and TDD techniques, as discussed above, can yield even lower test times (provided filtering does not take longer than the otherwise gained time advantage, e.g., by using hardware filtering), although more complex test sequences may be required (with each DUT running a different sequence) and frequency planning should be done to avoid inter-modulation products affecting the measured transmit quality or other demanding measurements.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing a plurality of data signal transmitters with a data signal analyzer, comprising:
   receiving a plurality N of packet data signals simultaneously from a corresponding plurality N of data signal transmitters, wherein
      each one of said plurality N of packet data signals has a respective plurality of sequential signal intervals,
      each one of said plurality of sequential signal intervals has a signal interval duration I, and
      each one of said plurality N of packet data signals has a respective packet data signal characteristic during each one of said respective plurality of sequential signal intervals;
   capturing a respective portion of said respective plurality of sequential signal intervals from each one of said plurality N of packet data signals to provide a plurality N of captured portions of said respective plurality of sequential signal intervals, wherein each one of said plurality N of captured portions of said respective plurality of sequential signal intervals has a captured signal duration C; and
   processing each one of said plurality N of captured portions of said plurality of sequential signal intervals in accordance with a signal test having a test duration T associated therewith;
   wherein said captured signal duration C is
      greater than or equal to said test duration T when said test duration T is greater than a portion I/N of said signal interval duration I, and
      less than or equal to said portion I/N of said signal interval duration I when said test duration T is less than or equal to said portion I/N of said signal interval duration I.

2. The method of claim 1, wherein said respective plurality of sequential signal intervals comprises a respective plurality of sequential signal time slots.

3. The method of claim 1, further comprising initiating simultaneous transmission by said plurality of data signal transmitters of said corresponding plurality of packet data signals.

4. The method of claim 1, further comprising initiating synchronous transmission by said plurality of data signal transmitters of said corresponding plurality of packet data signals.

5. The method of claim 1, further comprising initiating transmission by said plurality of data signal transmitters of said corresponding plurality of packet data signals by transmitting a trigger signal simultaneously to each of said plurality of data signal transmitters.

6. The method of claim 1, wherein said plurality N of captured portions of said respective plurality of sequential signal intervals comprises a plurality N of time-interleaved portions of said respective plurality of sequential signal intervals.

7. A method of testing a plurality of data signal transmitters with a data signal analyzer, comprising:
   receiving a plurality N of packet data signals simultaneously from a corresponding plurality N of data signal transmitters, wherein
      each one of said plurality N of packet data signals has a respective plurality of sequential signal intervals,
      each one of said plurality of sequential signal intervals has a signal interval duration I, and
      each one of said plurality N of packet data signals has a respective packet data signal characteristic during each one of said respective plurality of sequential signal intervals;
   capturing a respective portion of said respective plurality of sequential signal intervals from each one of said plurality N of packet data signals to provide a plurality N of captured portions of said respective plurality of sequential signal intervals, wherein each one of said plurality N of captured portions of said respective plurality of sequential signal intervals has a captured signal duration C; and processing each one of said plurality N of captured portions of said plurality of sequential signal intervals in accordance with a signal test having a test duration T associated therewith;

wherein said captured signal duration C is greater than or equal to said test duration T when said test duration T is greater than a portion I/N of said signal interval duration I.

8. The method of claim 7, wherein said respective plurality of sequential signal intervals comprises a respective plurality of sequential signal time slots.

9. The method of claim 7, further comprising initiating simultaneous transmission by said plurality of data signal transmitters of said corresponding plurality of packet data signals.

10. The method of claim 7, further comprising initiating synchronous transmission by said plurality of data signal transmitters of said corresponding plurality of packet data signals.

11. The method of claim 7, further comprising initiating transmission by said plurality of data signal transmitters of said corresponding plurality of packet data signals by transmitting a trigger signal simultaneously to each of said plurality of data signal transmitters.

12. The method of claim 7, wherein said plurality N of captured portions of said respective plurality of sequential signal intervals comprises a plurality N of time-interleaved portions of said respective plurality of sequential signal intervals.

13. A method of testing a plurality of data signal transmitters with a data signal analyzer, comprising:
receiving a plurality N of packet data signals simultaneously from a corresponding plurality N of data signal transmitters, wherein
each one of said plurality N of packet data signals has a respective plurality of sequential signal intervals,
each one of said plurality of sequential signal intervals has a signal interval duration I, and
each one of said plurality N of packet data signals has a respective packet data signal characteristic during each one of said respective plurality of sequential signal intervals;

capturing a respective portion of said respective plurality of sequential signal intervals from each one of said plurality N of packet data signals to provide a plurality N of captured portions of said respective plurality of sequential signal intervals, wherein each one of said plurality N of captured portions of said respective plurality of sequential signal intervals has a captured signal duration C; and processing each one of said plurality N of captured portions of said plurality of sequential signal intervals in accordance with a signal test having a test duration T associated therewith;

wherein said captured signal duration C is less than or equal to said portion I/N of said signal interval duration I when said test duration T is less than or equal to said portion I/N of said signal interval duration I.

14. The method of claim 13, wherein said respective plurality of sequential signal intervals comprises a respective plurality of sequential signal time slots.

15. The method of claim 13, further comprising initiating simultaneous transmission by said plurality of data signal transmitters of said corresponding plurality of packet data signals.

16. The method of claim 13, further comprising initiating synchronous transmission by said plurality of data signal transmitters of said corresponding plurality of packet data signals.

17. The method of claim 13, further comprising initiating transmission by said plurality of data signal transmitters of said corresponding plurality of packet data signals by transmitting a trigger signal simultaneously to each of said plurality of data signal transmitters.

18. The method of claim 13, wherein said plurality N of captured portions of said respective plurality of sequential signal intervals comprises a plurality N of time-interleaved portions of said respective plurality of sequential signal intervals.

* * * * *